UNITED STATES PATENT OFFICE.

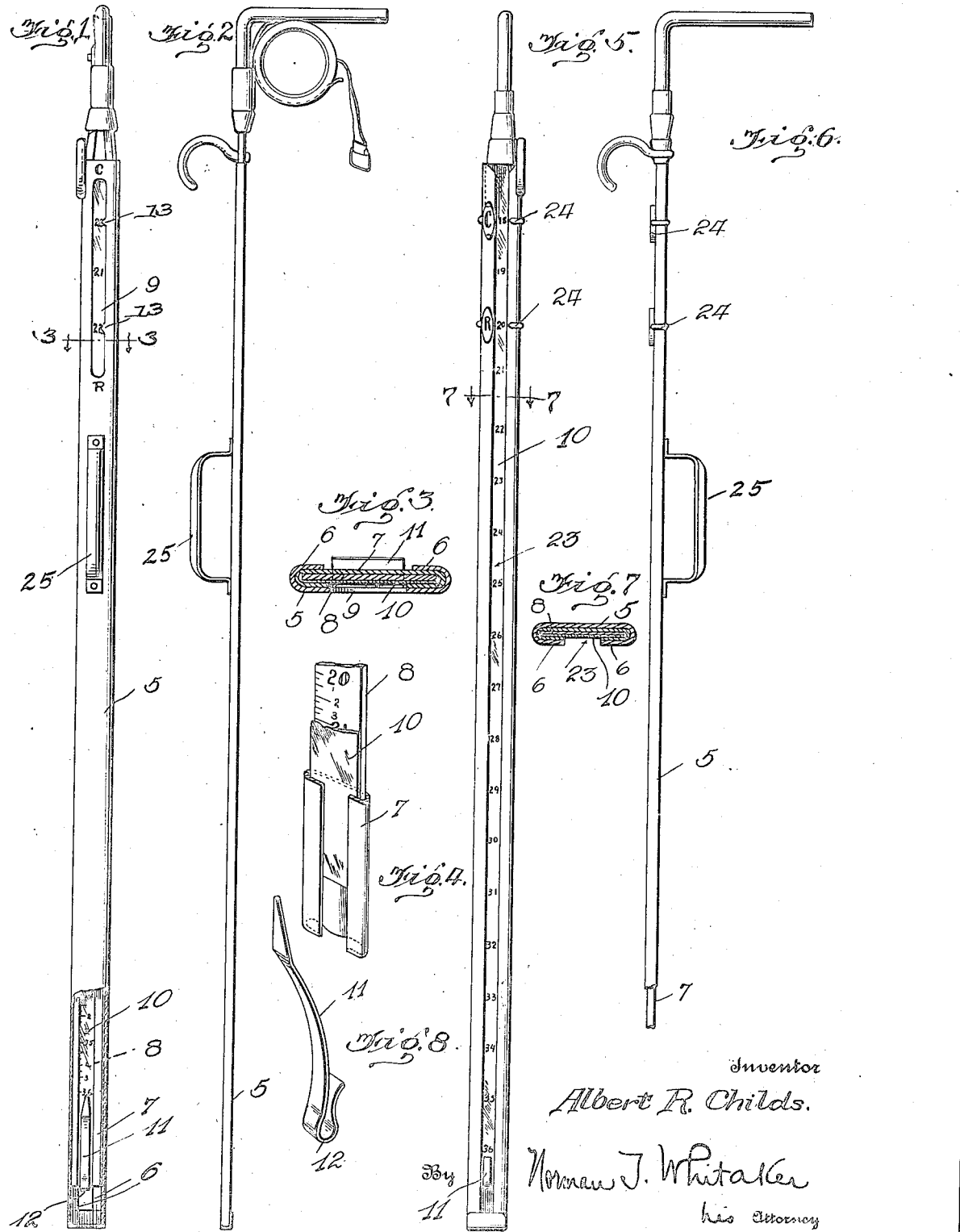

ALBERT R. CHILDS, OF FREMONT, OHIO.

INSEAM MEASURE.

1,425,175.　　　　Specification of Letters Patent.　　Patented Aug. 8, 1922.

Application filed January 26, 1921. Serial No. 440,034.

*To all whom it may concern:*

Be it known that I, ALBERT R. CHILDS, a citizen of the United States, and a resident of Fremont, in the county of Sandusky and State of Ohio, have invented a new and useful Inseam Measure, of which the following is a specification.

My invention is a measuring instrument, principally adapted for use by tailors, and its principal object resides in the provision of an adjustable measure for accurately measuring the length of a trouser inseam, without causing embarrassment to the person being measured.

Further, it is the purpose of the invention to provide a measuring device of this type which will obviate the necessity of the operator assuming a kneeling position, such as is usual in measuring the inseam with a tape measure.

The invention also embodies a longitudinally adjustable measuring device which will give the correct reading of the length of a trouser leg with or without the cuff in a single operation.

Also it is within the provision of the invention to provide a tailor's measure embodying a tape measure holder so positioned with respect to the measure as to facilitate the measuring of the waist-line and other desirable parts.

The device embodied in the present invention is of comparatively simple construction and may be therefore produced at a nominal cost.

With the preceding and other objects and advantages as may become apparent from the disclosure, the invention consists of the novel combination of elements, construction and arrangement of parts, operations and details to be hereinafter specified, claimed and illustrated in the accompanying drawings, wherein:

Figure 1 is a side elevation of the invention, parts being broken away;

Figure 2 is an elevation taken at right angles to Figure 1;

Figure 3 is a transverse sectional view taken on line 3—3 of Figure 1;

Figure 4 is a fragmentary detail perspective of the device.

Figure 5 is a side elevation of a modified embodiment of the invention;

Figure 6 is an elevation taken at right angles to Figure 5;

Figure 7 is a transverse sectional view taken on line 7—7 of Figure 5, and

Figure 8 is a perspective of the spring device embodied in the invention.

Referring in detail to the drawings wherein like characters of reference designate like parts throughout the several views, the numeral 5 designates a relatively flat tubular member formed from a longitudinal sheet of metal having its opposite longitudinal edges turned inwardly toward each other, as shown at 6. A similar member 7 is slidably received in the tubular member 5 and is arranged so that its inturned edges extend in the opposite direction from the inturned edges 6 of the tubular member 5. Held in the tubular member 7 is a graduated tape 8 adapted to be read in the sight opening 9 in the tubular member 5, the sight opening being provided with pointers 13 at one side thereof with which the graduations on the tape 8 are adapted to register.

A transparent celluloid strip 10 is also held in the tubular member 7.

In order to prevent the parts 5 and 7 from being moved with respect to each other too freely, there is provided a bowed leaf spring 11 terminating in a clip 12 at one end which is engaged with the inner end of the tubular member 7. This spring lies against the inner face of the tubular member 5 and engages the same with sufficient resiliency as to prevent the members 5 and 7 from becoming moved too freely.

In the construction shown in Figures 5 and 6, the slidably connected tubular members are arranged so that their longitudinal slots 23 register. The inner tubular member carries the graduated tape and transparent strip referred to in connection with the preceding modification. Secured to the outer tubular member adjacent its upper end and disposed one above the other are pointers 24 corresponding to the pointers 13 referred to in the description of Figure 1.

In both embodiments of the invention a handle 25 is carried by the outer tubular member.

It is to be understood that the forms of my invention herein shown and described are to be taken as preferred examples of the same, and that various changes in the shape, size and arrangement of parts may be resorted to without departing from the spirit of the invention or the scope of the subjoined claims.

Having thus described my invention, what I claim as new and desire to secure and protect by Letters Patent of the United States, is:

1. A device of the character described including a pair of tubular telescopic members, each of which being formed from a longitudinal sheet of metal having its longitudinal edges bent upon itself, the tubular members being oppositely disposed and one of which being provided with a sight opening, and a graduated scale element carried by the other tubular member and adapted to register with the sight opening.

2. A device of the character described including a pair of tubular telescopic members, each of which being formed from a longitudinal sheet of metal having its longitudinal edges bent upon itself, the tubular members being oppositely disposed and one of which being provided with a sight opening, a graduated scale carried by the other tubular member and adapted to register with the sight opening, and a bowed leaf spring interposed between the telescopic members and terminating in a clip at one end having engagement with one of said members.

ALBERT R. CHILDS.